United States Patent
Bernhammer et al.

(10) Patent No.: US 12,366,230 B2
(45) Date of Patent: Jul. 22, 2025

(54) MONITORING OF BLADES IN WIND TURBINES

(71) Applicant: Siemens Gamesa Renewable Energy A/S, Brande (DK)

(72) Inventors: Lars Oliver Bernhammer, Pamplona (ES); Purim Ladpli, Støvring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/019,212

(22) PCT Filed: Jul. 21, 2021

(86) PCT No.: PCT/EP2021/070311
§ 371 (c)(1),
(2) Date: Feb. 1, 2023

(87) PCT Pub. No.: WO2022/033816
PCT Pub. Date: Feb. 17, 2022

(65) Prior Publication Data
US 2023/0304477 A1    Sep. 28, 2023

(30) Foreign Application Priority Data

Aug. 14, 2020 (EP) ..................... 20191162

(51) Int. Cl.
*F03D 17/00* (2016.01)
*F03D 1/06* (2006.01)

(52) U.S. Cl.
CPC ........... *F03D 17/00* (2016.05); *F03D 1/0675* (2013.01); *F05B 2240/31* (2013.01); *F05B 2270/342* (2020.08)

(58) Field of Classification Search
CPC .... F03D 17/00; F03D 1/0675; F05B 2240/31; F05B 2240/3052; F05B 2270/342; F05B 2270/334; Y02E 10/72
See application file for complete search history.

(56) References Cited

U.S. PATENT DOCUMENTS

| | | | | |
|---|---|---|---|---|
| 7,883,319 B2 * | 2/2011 | Volkmer | ................ | G01H 1/006 416/61 |
| 7,945,351 B2 * | 5/2011 | Lim | ........................ | F03D 7/042 290/44 |

(Continued)

FOREIGN PATENT DOCUMENTS

| CN | 101806277 A | 8/2010 |
|---|---|---|
| CN | 102459874 A | 5/2012 |

(Continued)

OTHER PUBLICATIONS

PCT International Search Report and Written Opinion of International Searching Authority mailed Nov. 8, 2021 corresponding to PCT International Application No. PCT/EP2021/070311 filed Jul. 21, 2021.

*Primary Examiner* — David E Sosnowski
*Assistant Examiner* — Wayne A Lambert
(74) *Attorney, Agent, or Firm* — Schmeiser, Olsen & Watts LLP

(57) ABSTRACT

A method for detecting a status of a rotor blade for a wind turbine, the rotor blade including at least an aerodynamic device for influencing the airflow, the aerodynamic device being movable between a first and a second configuration, the method including the steps of: measuring an output signal measured by at least one sensor installed on the wind turbine, moving the aerodynamic device between the first configuration and the second configuration, measuring a change in the induced output signal, post-processing the measured output signal, wherein the post-processing is (Continued)

performed in the frequency domain and includes: deriving a frequency spectrum 1, calculating an upper spectrum interval of the frequency spectrum above a frequency threshold value, comparing the upper spectrum interval with a reference frequency spectrum deriving a status of the rotor blade based on the step of comparing.

13 Claims, 5 Drawing Sheets

(56) References Cited

U.S. PATENT DOCUMENTS

| | | | |
|---|---|---|---|
| 8,123,478 B2* | 2/2012 | Ahmann | F03D 7/0296 |
| | | | 416/61 |
| 8,186,950 B2* | 5/2012 | Benito | F03D 80/40 |
| | | | 416/61 |
| 8,360,722 B2* | 1/2013 | Hoffmann | F03D 7/0296 |
| | | | 416/61 |
| 8,511,988 B2 | 8/2013 | Birkemose et al. | |
| 9,316,206 B2* | 4/2016 | Laurberg | F03D 17/00 |
| 9,567,869 B2* | 2/2017 | Lauritsen | F03D 17/00 |
| 10,072,635 B2* | 9/2018 | Fu | G01L 3/02 |
| 10,466,205 B2* | 11/2019 | Brenner | G01N 29/12 |
| 2009/0277266 A1 | 11/2009 | Wang et al. | |
| 2010/0021297 A1* | 1/2010 | Kuhlmeier | G05B 23/0237 |
| | | | 416/31 |
| 2010/0158688 A1 | 6/2010 | Benito et al. | |
| 2010/0175480 A1* | 7/2010 | Guy | G01N 3/20 |
| | | | 73/660 |
| 2012/0068469 A1 | 3/2012 | Behrens et al. | |
| 2012/0107117 A1 | 5/2012 | Godsk et al. | |
| 2013/0031966 A1* | 2/2013 | Egedal | F03D 7/042 |
| | | | 73/112.01 |
| 2013/0167625 A1 | 7/2013 | Becker | |
| 2015/0000404 A1* | 1/2015 | Brenner | G01N 29/12 |
| | | | 73/579 |
| 2015/0107343 A1 | 4/2015 | Domke et al. | |
| 2015/0322924 A1* | 11/2015 | Menasanch De Tobaruela | |
| | | | F03D 1/06 |
| | | | 73/660 |
| 2016/0053748 A1* | 2/2016 | Lee | G01D 5/268 |
| | | | 702/182 |
| 2019/0211805 A1* | 7/2019 | Elmose | F03D 17/00 |
| 2020/0347827 A1* | 11/2020 | Nielsen | F03D 80/40 |
| 2022/0025861 A1* | 1/2022 | Egedal | F03D 7/0224 |

FOREIGN PATENT DOCUMENTS

| | | | | |
|---|---|---|---|---|
| CN | 102459876 A | | 5/2012 | |
| CN | 102678453 A | * | 9/2012 | F03D 7/0204 |
| DE | 102005017054 B4 | | 2/2012 | |
| EP | 2565444 A1 | | 3/2013 | |
| EP | 2588752 A2 | | 5/2013 | |
| EP | 2610604 A2 | | 7/2013 | |
| EP | 3009673 A1 | * | 4/2016 | F03D 7/0268 |
| EP | 3172434 A1 | | 5/2017 | |
| EP | 2122430 B1 | | 12/2017 | |
| EP | 3167185 B1 | | 8/2019 | |
| WO | WO-2012066107 A2 | * | 5/2012 | F03D 17/00 |
| WO | WO2012066107 A9 | * | 7/2012 | |

* cited by examiner

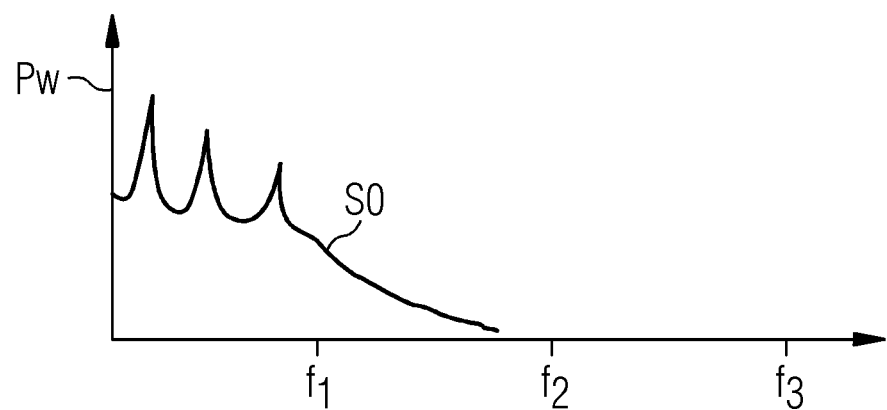
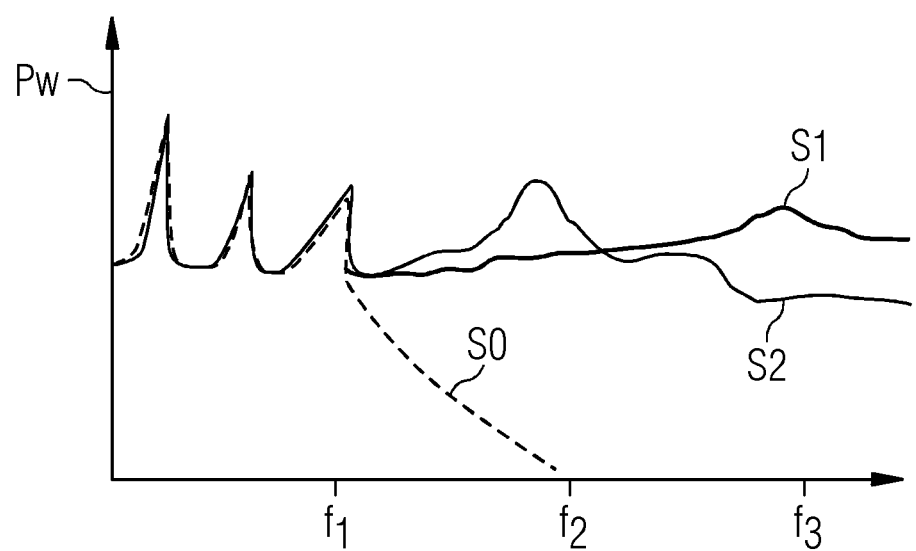

MONITORING OF BLADES IN WIND TURBINES

CROSS-REFERENCE TO RELATED APPLICATIONS

This application claims priority to PCT Application No. PCT/EP2021/070311, having a filing date of Jul. 21, 2021, which claims priority to EP Application Serial No. 20191162.5, having a filing date of Aug. 14, 2020, the entire contents both of which are hereby incorporated by reference.

FIELD OF TECHNOLOGY

The following relates to a method for monitoring blades in wind turbines. The method of the following may be used for detecting a faulty status of such blade. The following relates to a wind turbine including a controller configured for monitoring blades in wind turbines.

BACKGROUND

Damages in wind turbine blades can lead to costly component exchanges, particularly if not spotted early in the damage development. Structural health monitoring aims at spotting these damages and it relies on natural excitation of the structure based on low-frequencies natural excitation. Structural health monitoring of blades is based on monitoring the structural response (i.e. deflections, natural frequencies, strains or accelerations) to an external excitation, i.e. variations in wind speed, turbulence and gravitational loading on the blades during operation.

The low frequency of the excitation renders acceleration based structural health monitoring ineffective as the size of the damage that can be found scales inversely with the excitation frequency. Another solution involving the use of blade actuators, for example pitch actuators, and vibration sensors is described in EP 2588752 A2.

It is therefore desirable to provide a more effective method for monitoring the status of blades of wind turbines. In particular, it is desirable that such a method identifies as early as possible a faulty status of a wind turbine blade.

SUMMARY

According to a first aspect of embodiments of the present invention, it is provided a method for detecting a status of a rotor blade for a wind turbine, the rotor blade including at least an aerodynamic device for influencing the airflow flowing from the leading edge to the trailing edge of the rotor blade, the aerodynamic device being movable between a first configuration and a second configuration, the method comprising the steps of:

measuring an output signal measured by at least one sensor installed on the wind turbine,
moving the aerodynamic device between the first configuration and the second configuration,
measuring a change in the output signal induced by the moving of the aerodynamic device between the first configuration and the second configuration,
post-processing the measured output signal for performing an analysis of the measured change in the output signal, wherein the post-processing step is performed in the frequency domain and includes:
deriving a frequency spectrum (S2) of the output signal,
calculating an upper spectrum interval of the frequency spectrum (S2) above a frequency threshold value (f1),
comparing the upper spectrum interval with a reference frequency spectrum (S1)
deriving a status of the rotor blade based on said step of comparing.

According to a second aspect of embodiments of the present invention, it is provided a wind turbine comprising:
at least one the rotor blade,
at least one sensor,
at least an aerodynamic device on the rotor blade for influencing the airflow flowing from the leading edge of to the trailing edge of the rotor blade,
a controller connected to the at least one sensor and configured for executing the steps of the method.

Embodiments of this Invention May be Applied to Both Onshore and Offshore Wind Turbine Installation.

Active aerodynamic devices allow for the generation of a sharp excitation signal containing higher frequencies such that smaller defects can be captured when analysing a frequency spectrum of the output signal generated a sensor installed on the wind turbine. Higher frequency signals are induced during and/or for a short time immediately following the change in the configurations of an active aerodynamic device. The output signal contains a higher frequency content compared to the natural excitation (e.g. at frequency greater than 5 Hz or 10 Hz). At least one active aerodynamic device (e.g. a flap or spoiler or micro tab or a plurality active suction or blowing jets or an actively changing vortex generator or a slat or similar active aerodynamic device) provided on a blade may be used to generate a rapid change in load on the blade structure by means of aerodynamic pressure, thereby triggering a structural response. This happens when the active aerodynamic device is moved from a first configuration to a second configuration, which influences the airflow flowing around the blade differently from the first configuration. This signal may be captured by at least one sensor provided on the wind turbine (e.g. on the blade itself or on the nacelle assembly or on the turbine tower). The sensor may be an accelerometer or strain gauge or inclinometer or gyroscope or any other device that can determine strain, displacement, rotation, natural frequency, rotational speed or acceleration. Such an arrangement may be used for detecting a faulty status of the blade.

As "frequency spectrum" it is meant a spectrum which can be represented in a 2D-cartesian diagram where the amplitude is measured along axis and the frequency is measured along the other axis. The comparison between the upper spectrum interval with the reference frequency spectrum may be based on a comparison along the amplitude axis or along the frequency axis.

The "reference frequency spectrum" identifies a healthy condition of the blade. It may be measured during a known healthy status of the rotor blade, or it may be calculated based on a model of the rotor blade in a healthy status.

According to embodiments of the invention, a faulty status of the rotor blade may be identified when a difference between the upper spectrum interval and the reference frequency spectrum exceeds a predefined threshold. For example, the predefined threshold may be a predefined fixed value, based on statistical consideration on previous faulty events or a predefined percentage of the spectrum amplitude reference. By increasing the excitation frequency, smaller damages can be monitored with sufficient signal-to-noise ratio, i.e. a developing damage can be identified in an earlier stage, thereby reducing maintenance costs.

According to embodiments of the invention, the step of comparing includes comparing peaks of the upper spectrum interval and of the reference frequency spectrum, a faulty status of the rotor blade being identified when at least a peak of the upper spectrum interval of the frequency spectrum is shifted in frequency with respect to the peaks of the reference frequency spectrum. In such embodiments, a shift along the frequency axis identifies a faulty condition of the blade.

According to embodiments of the invention, the method includes the steps of:
- measuring at least two output signals respectively corresponding to a first blade and at least a second blade of the wind turbine,
- deriving two frequency spectrums of the two output signals,
- calculating a first upper spectrum interval for the first blade and a second upper spectrum interval for the second blade of the two frequency spectrums above a frequency threshold value,
- comparing the first upper spectrum interval the second upper spectrum interval, the second upper spectrum interval being the reference frequency spectrum,
- deriving a status of the first rotor blade based on said step of comparing. In particular, the frequency spectrums of all the blades of the wind turbine may be calculated and compared with each other, a status of a rotor blade being base on the comparison with another blade, considered as healthy. For wind turbines having three blades, a status of each rotor blade may be based on a comparison with the other two blades, or with an average of the other two blades, a faulty status being identified when a difference is identified between the upper spectrum interval of one rotor blade with both the upper spectrum interval of the other two blades.

In wind turbine, each rotor blade extends between a root section attached to the rotor and an opposite free tip section. A plurality of aerofoil sections for generating lift are provided between the root section and the tip sections. Each aerofoil section comprises a suction side and a pressure side, both extending between a leading edge and a trailing edge. One or more active aerodynamic devices may be arranged on the suction side (e.g. one or more spoilers and/or one or more vortex generators and/or a plurality of microjets for suction or blowing) on the pressure side and/or at the leading edge (e.g. one or more slats) and/or at the trailing edge (e.g. one or more flaps and/or micro tabs). Each active aerodynamic device is movable between a first configuration and a second configuration. The first configuration may be an active configuration in which the aerodynamic device influences the airflow flowing around the blade from the leading edge to the trailing edge. The second configuration may be an inactive configuration in which the influence of the aerodynamic device on the airflow is minimal or negligible. Alternatively, the second configuration may be a second active configuration in which the aerodynamic device influences the airflow differently from the first active configuration. For example, the aerodynamic device may be completely deployed in the first configuration and partially deployed in the second configuration.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 6 shows a frequency spectrum of an output signal provided by a sensor installed on the wind turbine of FIG. 2 when all active aerodynamic devices are in the inactive configuration; and FIG. 7 shows another frequency spectrum of an output signal provided by a sensor installed on the wind turbine of FIG. 2 when at least one active aerodynamic device is brought in the active configuration.

DETAILED DESCRIPTION

The drawings are in schematic form. Similar or identical elements are referenced by the same or different reference signs.

Figure 1:
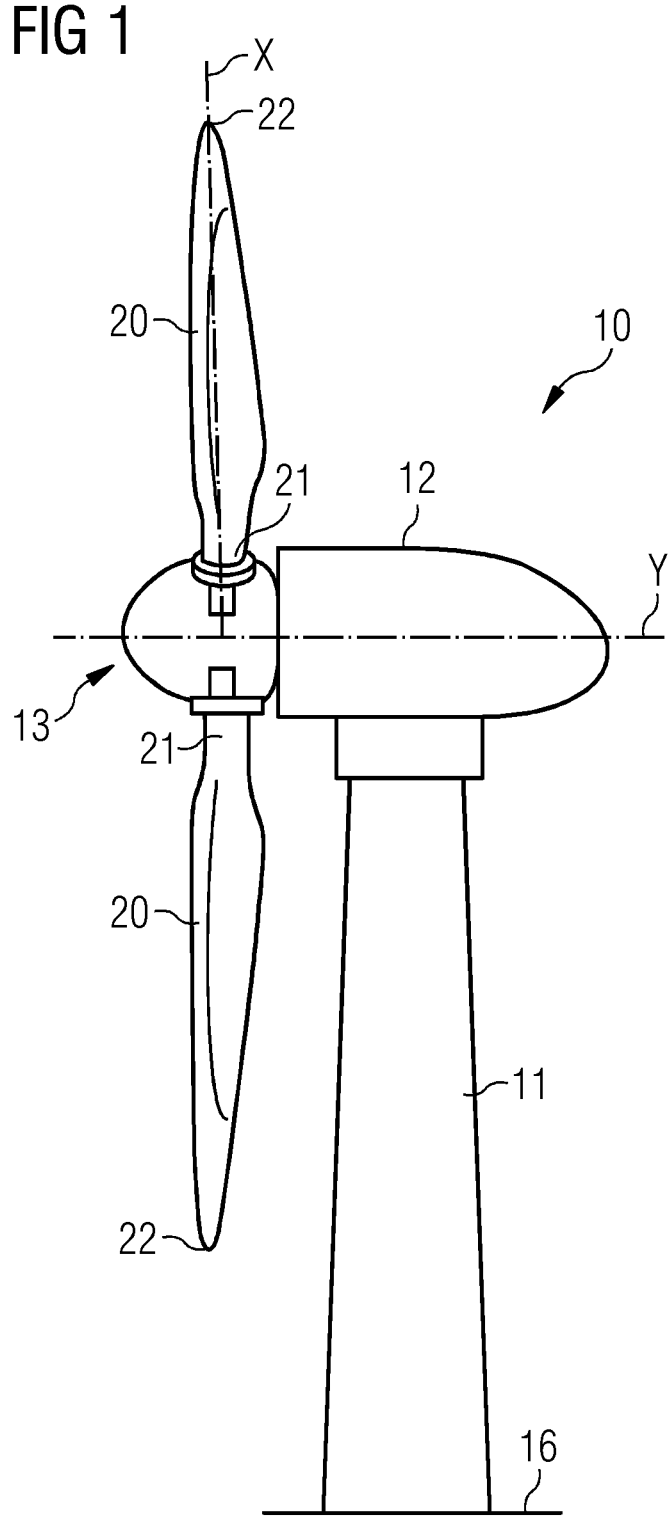
FIG. 1 shows a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y.

The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 4 extend substantially radially with respect to the rotational axis Y. Each rotor blade 20 is usually mounted pivotable to the hub 13, in order to be pitched about respective pitch axes X. Each rotor blade 20 is mounted to the hub 13 at its root section 21. The root section 21 is opposed to the tip section 22 of the rotor blade.

Figure 2:
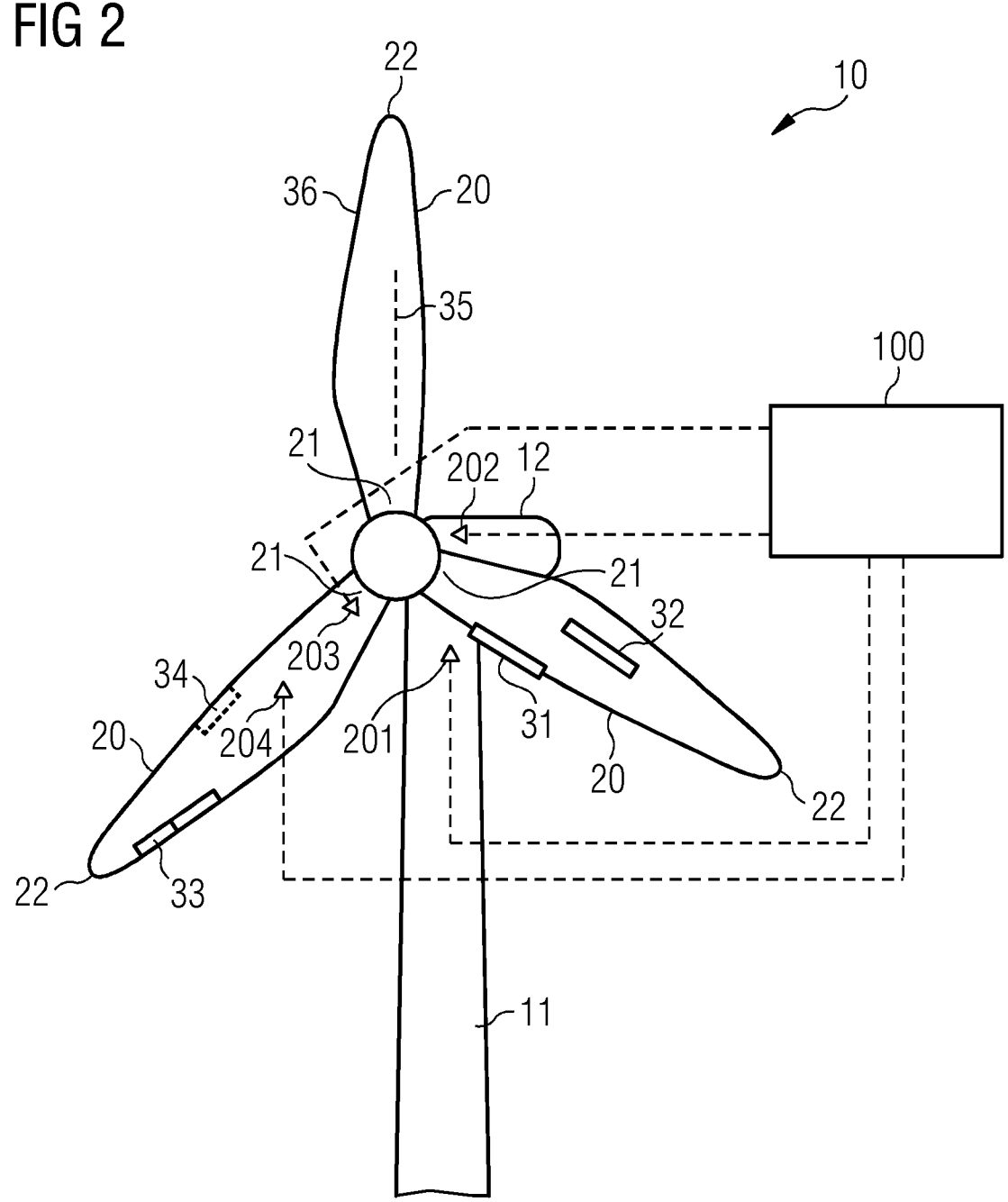
FIG. 2 shows a wind turbine with a plurality of active aerodynamic device on the rotor blades.
Figure 3:
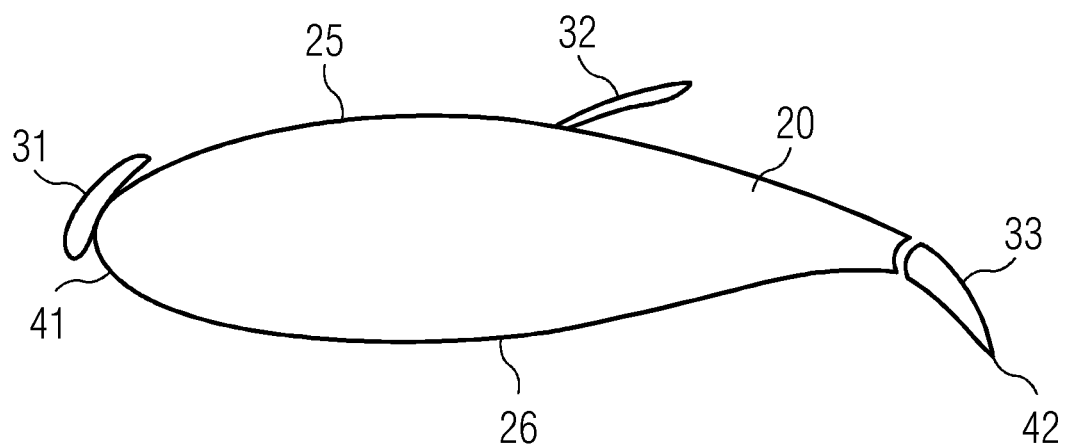
FIG. 3 shows a radial section of one rotor blade of FIG. 2.
Figure 4:
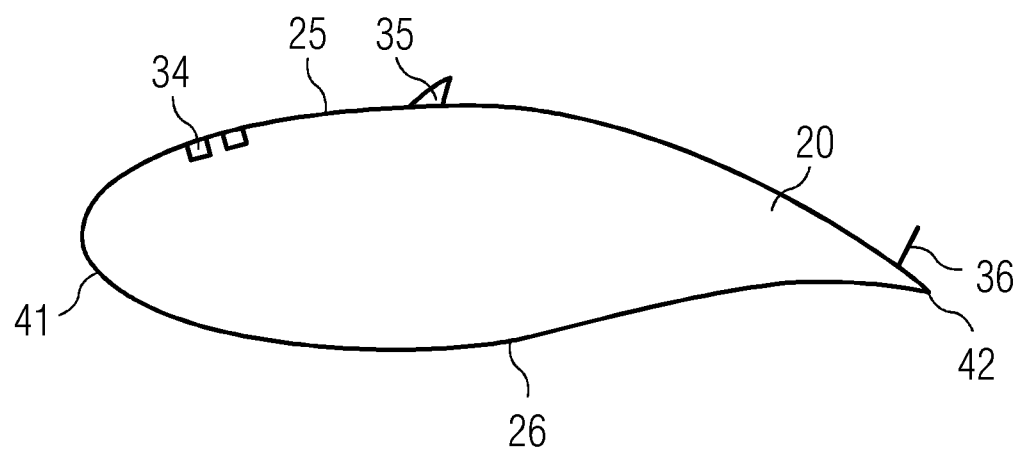
FIG. 4 shows another radial section of one rotor blade of FIG. 2.

FIGS. 2 to 4 illustrate a plurality of active aerodynamic device 31, 32, 33, 34, 35, 36 provided on the rotor blades 20. Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by two aerofoil profiles which are respectively shown in FIGS. 3 and 4 and which illustrates the cross-sectional shape of the rotor blade at this spanwise position. Also note that the suction side 25 is divided or separated from the pressure side 26 by a leading edge 41, where the incoming airflow meets the blade 20 and a trailing edge 42, where the airflow leaved the blade. As shown in the exemplary embodiment of FIG. 3, a first active aerodynamic device 31 is a slat provided at the leading edge 41, a second active aerodynamic device 32 is a spoiler provided between the leading edge 41 and the trailing edge 42 and a third active aerodynamic device 33 is a flap provided at the trailing edge 42. As shown in the exemplary embodiment of FIG. 4, a fourth active aerodynamic device 34 is a plurality of microjets for suction or blowing of air provided between the leading edge 41 and the trailing edge 42, a fifth active aerodynamic device 35 is a plurality of vortex generators provided between the leading edge 41 and the trailing edge 42 and a sixth active aerodynamic device 36 is a plurality of micro tabs provided at the trailing edge 42. The active aerodynamic device 31, 32, 33, 34, 35, 36 are also shown on FIG. 2: a flap 33 and a plurality of microjets 34 for suction or blowing of air being shown on a first rotor blade 20, a slat 31 and a flap 32 being shown on a second rotor blade 20, a plurality of vortex generators 35 and a plurality of micro tabs 36 being shown on a third rotor blade 20. According to embodiments of the invention, the active aerodynamic devices 31, 32, 33, 34, 35, 36 provided on one rotor blade 20 may be different from the active aerodynamic devices 31, 32, 33, 34, 35, 36 provided on the other rotor blades 20. According to other embodiments of the invention, the blades 20 of the same wind turbine 10 may include the same active aerodynamic devices 31, 32, 33, 34, 35, 36. According to other embodiments of the invention, the blades 20 may include other type of active aerodynamic devices 31, 32, 33, 34, 35, 36, different from the ones above described. The aerodynamic device 31, 32, 33, 34, 35, 36 according to embodiments of the present invention are movable between a first active configuration in which the aerodynamic device 31, 32, 33, 34, 35, 36 influences the airflow and a second inactive configuration, in which the influence of the aerodynamic device 31, 32, 33, 34, 35, 36 on the airflow is minimal or negligible. For example, the spoiler 32 and the vortex generators 35 are aligned to the suction side 25 in the second inactive configuration (not shown) and protruding from the the suction side 25 in the first active configuration (as shown in FIGS. 3 and 4, respectively). The flaps 33 and micro tabs 36 are aligned to the suction side 25 at the trailing edge 42 in the second inactive configuration (not shown) and deviating from the the suction side 25 in the first active configuration (as shown in FIGS. 3 and 4, respectively). The plurality of microjets 34 are open for suction or blowing of air in the first active configuration and closed in the second inactive configuration.

FIG. 2 further illustrates a plurality of sensors 201, 202, 203, 204 installed on the wind turbine 10. A first sensor 201 may be provided on the tower 11. A second sensor 202 may be provided on the nacelle 12. A third sensor 203 may be provided on a rotor blade 20 at the root section 21. A fourth sensor 204 may be provided on a rotor blade 20 between the root section 21 and the tip section 22. According to other embodiments of the present invention (not shown), the sensor(s) may be provided in different number and positions. The wind turbine 10 further includes a controller connected to the plurality of sensors 201, 202, 203, 204 for receiving a respective sensor output signal. The sensor(s) 201, 202, 203, 204 may be any sensor for generating as output signal a strain signal or displacement signal or rotation signal or natural frequency signal or rotational speed or acceleration signal.

The method according to embodiments of the present invention comprises the steps of:
 measuring an output signal measured by any of the sensors 201, 202, 203, 204,
 moving any of the aerodynamic device 31, 32, 33, 34, 35, 36 between the first configuration and the second configuration,
 measuring a change in the output signal,
 post-processing the measured output signal for performing an analysis of the measured change,
 comparing the post-processed signal with a reference signal or parameter,
 deriving a status of the rotor blade 20 based on said step of comparing.

Figure 5:
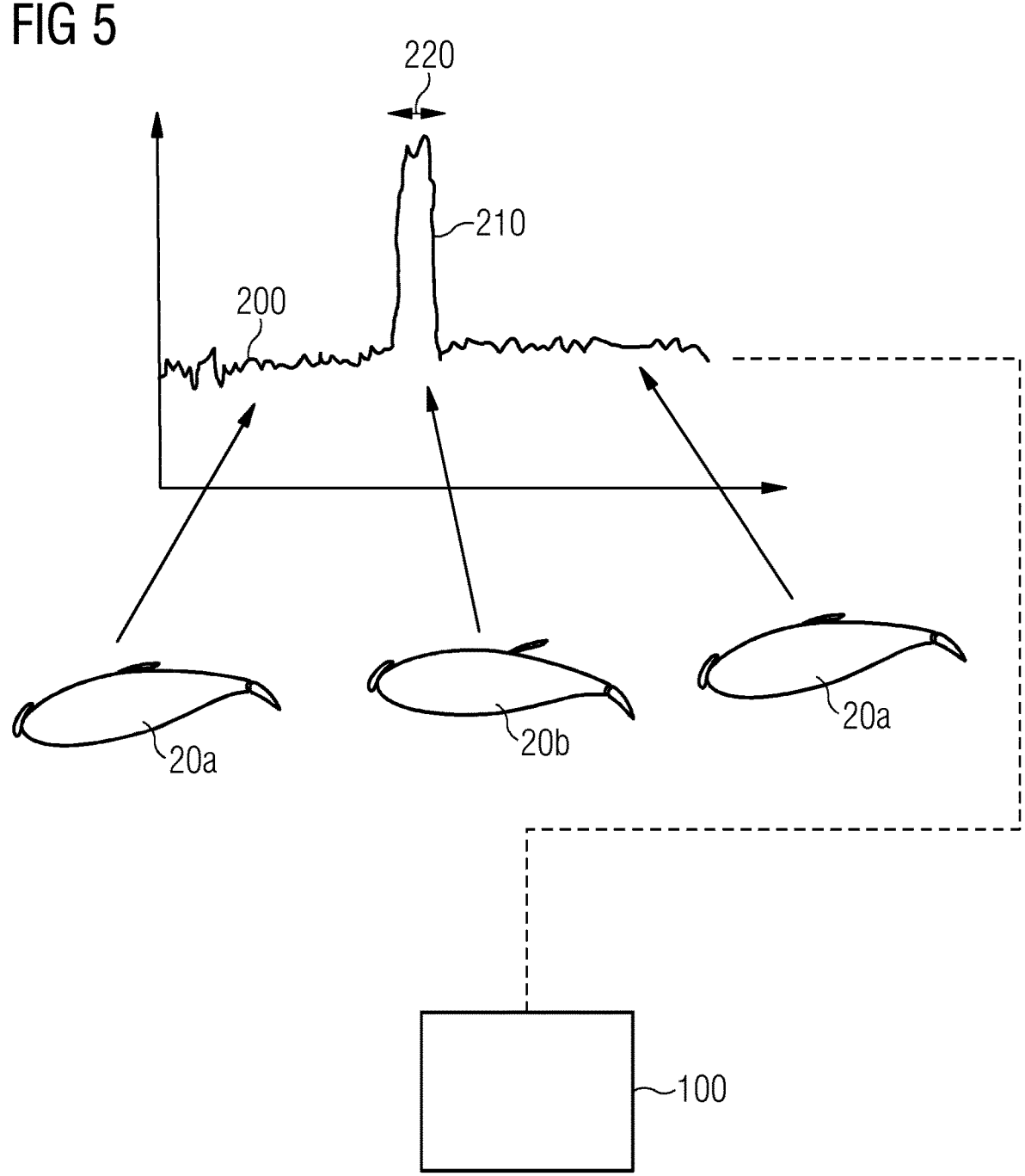
FIG. 5 shows an output signal provided by a sensor installed on the wind turbine of FIG. 2 when one active aerodynamic device is moved between two configurations.

The above steps may be executed in the controller 100 as shown in FIG. 5. In a cartesian graph an output acceleration signal 200 measured by an acceleration sensor is plotted as a function of time. The blade 20 is initially in a first configuration 20a where the aerodynamic devices 31, 32, 33, 34, 35, 36 are inactive. In a second configuration 20b of the blade 20 the spoiler 32 is made active for a time interval 220. The time interval 220 may be short and ranging between milliseconds to few seconds. During the time interval 220 a signal change 210 is measured in the output signal 200. After the time interval 220 the blade 20 is again brought to the first configuration 20a. The output acceleration signal 200 including the signal change 210 is sent to the controller 100 for post-processing. FIGS. 6 and 7 illustrates an embodiment of post-processing executed by the controller 100 according to embodiments of the present invention.

FIG. 6 shows a first frequency spectrum S0 derived when the aerodynamic devices 31, 32, 33, 34, 35, 36 are in one inactive configuration. The amplitude Pw of the frequency spectrum S0 is expressed in power units. The frequency spectrum S0 decrease rapidly after a first threshold frequency f1 which may be between 5 Hz and 20 Hz. At higher threshold frequencies f2, f3, the amplitude Pw of the frequency spectrum S0 may be considered negligible. The second threshold frequency f2 may be 100 Hz. The third threshold frequency f3 may be 1000 Hz.

FIG. 7 shows a second frequency spectrum S2 derived when any of the aerodynamic devices 31, 32, 33, 34, 35, 36 is from brought from the inactive configuration (FIG. 5) to one active configuration. When any of the aerodynamic devices 31, 32, 33, 34, 35, 36 changes configurations, high frequency is induced for a short period of time during and/or after the configuration change. According to embodiments of the present invention, an upper spectrum interval of the frequency spectrum S2 above the frequency threshold value f1 is considered. A comparison between the upper spectrum interval and a reference frequency S1 is performed. The reference frequency spectrum S1 corresponds to healthy conditions of the rotor blade 20. A faulty status of the rotor blade 20 is identified when differences between the upper spectrum interval of the frequency spectrum S2 and the reference frequency S1 appear. The reference frequency spectrum S1 may be predefined, for example previously registered from a blade in a healthy condition or calculated from a healthy blade model. The reference frequency spectrum S1 may be the upper spectrum interval which is determined for another blade of the same wind turbine.

According to other embodiments (not shown), the aerodynamic devices 31, 32, 33, 34, 35, 36 may change in configuration, e.g. active to inactive or inactive to active during a monitoring period. According to other embodiments (not shown), the aerodynamic devices 31, 32, 33, 34, 35, 36 may be moved between two different active configurations, for example the aerodynamic device may be completely or partially deployed in a first configuration and partially or completely deployed in a second configuration, respectively.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for detecting a status of a rotor blade for a wind turbine, the rotor blade including at least an aerodynamic device for influencing an airflow flowing from a leading edge to a trailing edge of the rotor blade, the aerodynamic device being movable between a first configuration and a second configuration, the method comprising:
measuring an output signal measured by at least one sensor installed on the wind turbine;
moving the aerodynamic device between the first configuration and the second configuration;
measuring a change in the output signal induced by the moving of the aerodynamic device between the first configuration and the second configuration;
post-processing the measured output signal for performing an analysis of the change in the output signal, wherein the post-processing step is performed in a frequency domain and includes:
deriving a frequency spectrum of the output signal, and
calculating an upper spectrum interval of the frequency spectrum above a frequency threshold value, wherein the frequency threshold value is a frequency at which an amplitude of the frequency spectrum starts decreasing rapidly when the aerodynamic device is in the first configuration, and the upper spectrum interval includes amplitudes at frequencies greater than the frequency threshold value when the aerodynamic device is in the second configuration;
comparing the upper spectrum interval with a reference frequency spectrum above the frequency threshold; and
deriving a status of the rotor blade based on the comparing.

2. The method according to claim 1, wherein the frequency threshold value is between 5 Hz and 20 Hz.

3. The method according to claim 1, wherein the comparing includes calculating a difference between the upper spectrum interval and the reference frequency spectrum.

4. The method according to claim 3, wherein a faulty status of the rotor blade is identified when the difference between the upper spectrum interval and the reference frequency spectrum exceeds a predefined threshold.

5. The method according to claim 1, wherein the comparing includes comparing peaks of the upper spectrum interval and of the reference frequency spectrum, a faulty status of the rotor blade being identified when at least a peak of the upper spectrum interval of the frequency spectrum is shifted in frequency with respect to the peaks of the reference frequency spectrum.

6. The method according to claim 1, wherein the reference frequency spectrum is predefined.

7. The method according to claim 6, wherein the reference frequency spectrum is measured during a known status of the rotor blade.

8. The method according to claim 6, wherein the reference frequency spectrum is calculated based on a model of the rotor blade.

9. The method according to claim 1, further comprising:
measuring at least two output signals respectively corresponding to a first blade and at least a second blade of the wind turbine;
deriving two frequency spectrums of the at least two output signals;
calculating a first upper spectrum interval for the first blade and a second upper spectrum interval for the second blade of the two frequency spectrums above a frequency threshold value;
comparing the first upper spectrum interval with the second upper spectrum interval, the second upper spectrum interval being the reference frequency spectrum; and
deriving a status of the first rotor blade based on the comparing.

10. The method according to claim 1, wherein the output signal is a strain or displacement or rotation or natural frequency or rotational speed or acceleration signal.

11. The method according to claim 1, wherein the frequency spectrum is a power spectrum.

12. The method according to claim 1, wherein the aerodynamic device is a flap or slat or spoiler or a microjet for suction or blowing or a vortex generator or a micro tab.

13. A wind turbine comprising:
at least one rotor blade;
at least one sensor;
at least an aerodynamic device on the at least one rotor blade for influencing an airflow flowing from a leading edge of to a trailing edge of the at least one rotor blade; and
a controller connected to the at least one sensor and configured for executing the method according to claim 1.

* * * * *